US011144672B2

(12) United States Patent
Vaidhyanathan et al.

(10) Patent No.: US 11,144,672 B2
(45) Date of Patent: Oct. 12, 2021

(54) ENTERPRISE RISK, SECURITY AND COMPLIANCE AUTOMATION SYSTEMS AND METHODS

(71) Applicant: International Business Machines Corporation, Armonk, NY (US)

(72) Inventors: Ramamurthy Vaidhyanathan, Cupertino, CA (US); Prabakar Sundarrajan, Saratoga, CA (US); Janga Aliminati, Sana Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/101,511

(22) Filed: Aug. 12, 2018

(65) Prior Publication Data
US 2020/0193058 A1    Jun. 18, 2020

Related U.S. Application Data

(60) Provisional application No. 62/544,193, filed on Aug. 11, 2017.

(51) Int. Cl.
| | |
|---|---|
| *G06F 21/62* | (2013.01) |
| *G06F 21/60* | (2013.01) |
| *G06F 16/17* | (2019.01) |
| *G06F 16/18* | (2019.01) |
| *G06F 21/57* | (2013.01) |

(52) U.S. Cl.
CPC ...... *G06F 21/6254* (2013.01); *G06F 16/1734* (2019.01); *G06F 16/1865* (2019.01); *G06F 21/577* (2013.01); *G06F 21/604* (2013.01)

(58) Field of Classification Search
CPC .. G06F 21/6254; G06F 21/577; G06F 21/604; G06F 16/1865; G06F 16/1734; H04L 63/20; H04L 41/0843; H04L 41/0893
See application file for complete search history.

(56) References Cited

U.S. PATENT DOCUMENTS

| | | | |
|---|---|---|---|
| 8,141,144 B2* | 3/2012 | Good | H04L 41/0806 726/14 |
| 2003/0065942 A1* | 4/2003 | Lineman | H04L 63/102 726/4 |
| 2013/0124712 A1* | 5/2013 | Parker | H04L 41/5051 709/224 |

* cited by examiner

*Primary Examiner* — Paul E Callahan
(74) *Attorney, Agent, or Firm* — Scott S. Dobson (57) ABSTRACT

A method useful for implementing an enterprise risk and compliance automation engine comprises the step of obtaining an information technology (IT) security policy standard. The method comprises normalizing the IT security policy standard into a machine-readable format. The method comprises templatizing the machine-readable format version of the IT security policy standard. Each template comprises a collection of controls. Each control comprises a statement that describes a condition that a transaction or activity an IT system is required to perform by IT security policy standard; discovering a set of configurations of the IT system. The method comprises comparing the set of configurations of the IT system with the collection of controls of each template. The method comprises generating a validation report that comprises a report of whether the set of configurations of the IT system satisfies the collection of controls of each template.

12 Claims, 10 Drawing Sheets

ENTERPRISE RISK, SECURITY AND COMPLIANCE AUTOMATION SYSTEMS AND METHODS

CLAIM OF PRIORITY

This application claims priority from U.S. Provisional Application No. 62/544,193, ENTERPRISE RISK AND COMPLIANCE AUTOMATION SYSTEMS AND METHODS and filed 11 Aug. 2017. This application is hereby incorporated by reference in its entirety for all purposes.

FIELD OF THE INVENTION

This description relates to the field of IT security and more specifically to enterprise risk and compliance automation.

DESCRIPTION OF THE RELATED ART

Enterprises have to demonstrate compliance to a se of IT security policies standards. The standard can consist of controls. A control can be manifested as a number of English sentences like terms in a legal agreement. While an English sentence can make sense to a human, it may not be in a formatted that is implemented by a computerized system verify compliance with the English sentence. Accordingly, improvements to translation of controls in the IT security policies standards to a set of actions that can be programmed and automated are desired.

SUMMARY

In one aspect, A method useful for implementing an enterprise risk and compliance automation engine comprises the step of obtaining an information technology (IT) security policy standard. The method comprises the step of normalizing the IT security policy standard into a machine-readable format. The method comprises the step of normalizing templatizing the machine-readable format version of the IT security policy standard. Each template comprises a collection of controls. Each control comprises a statement that describes a condition that a transaction or activity an IT system is required to perform by IT security policy standard; discovering a set of configurations of the IT system. The method comprises the step of normalizing comparing the set of configurations of the IT system with the collection of controls of each template. The method comprises the step of normalizing generating a validation report that comprises a report of whether the set of configurations of the IT system satisfies the collection of controls of each template.

BRIEF DESCRIPTION OF THE DRAWINGS

The Figures described above are a representative set and are not exhaustive with respect to embodying the invention.

DESCRIPTION

Disclosed are a system, method, and article of manufacture for enterprise risk and compliance automation. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method indeed some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Cloud computing can involve deploying groups of remote servers and/or software networks that allow centralized data storage and online access to computer services or resources. These groups of remote serves and/or software networks can be a collection of remote computing services.

Control Objectives for Information and Related Technologies (COBIT) is a good-practice framework created by international professional association ISACA for information technology (IT) management and IT governance. COBIT provides an implementable set of controls over information technology and organizes them around a logical framework of IT-related processes and enablers.

General Data Protection Regulation (GDPR) (Regulation (EU) 2016/679) is a regulation by which the European Parliament, the Council of the European Union and the European Commission intend to strengthen and unify data protection for all individuals within the European Union (EU).

Health Insurance Portability and Accountability Act of 1996, (HIPAA; Pub. L. 104-191, 110 Stat. 1936) can be a health-care privacy standard.

International Organization for Standardization (ISO) is an international standard-setting body composed of representatives from various national standards organizations.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

NIST Special Publication 800-53 provides a catalog of security controls for all U.S. federal formation systems except those related to national security.

Natural language processing (NLP) IS the field of computer, science concerned with human speech as it is spoken. NLP can include interactions between computers and human (natural) languages, and, in particular, concerned with programming computers to fruitfully process large natural language corpora.

Payment card industry (PCI) can be businesses associated with debit, credit, and other payment cards.

Payment Card Industry Data Security Standard can be a et of security requirements for credit card processors.

Plug and play computing systems can facilitate the discovery of a hardware component in a system without the need for physical device configuration and/or user intervention in resolving resource conflicts.

Additional example definitions are provided herein.

Example Systems

Figure 1:
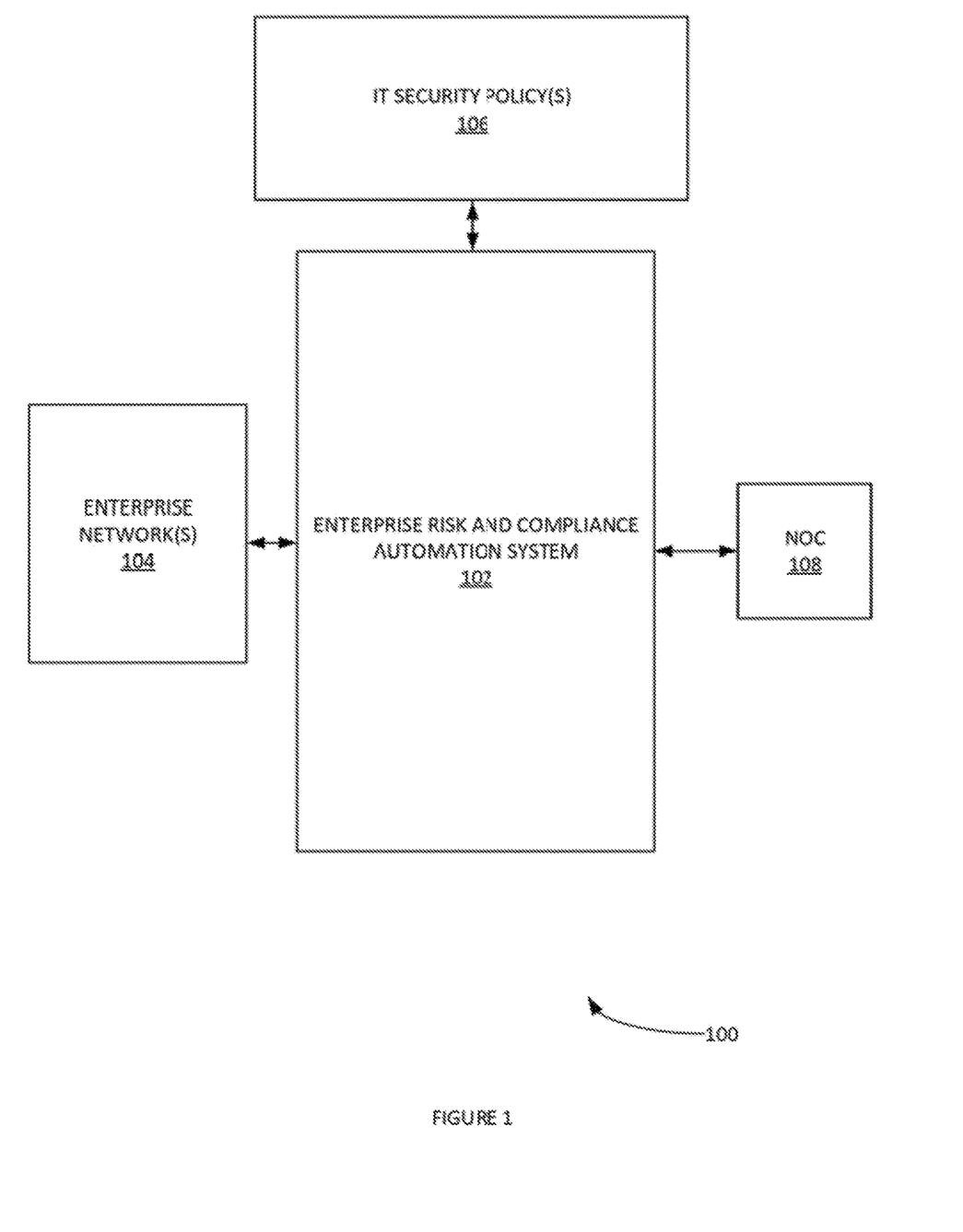
FIG. 1 illustrates an example system enterprise risk and compliance automation, according to some embodiments.

FIG. 1 illustrates an example system 100 enterprise risk and compliance automation, according to some embodiments. System 100 can include Enterprise risk and compliance automation (ERCA) system 102. ERCA system 102 enable enterprise entities prove compliance to various IT security policies in an automated manner. For example, an enterprise entity may use a credit-card payment system and be required to satisfy a PCI standard for its IT security policies. In another example, the enterprise entity may be a health provider that is required to satisfy a HIPPA standard for its IT security policies. In general, these various standards can be written in a human-readable format. ERCA system 102 transform these human-readable format standards into a format useable by an automated computer process. This version of the standards useable by an automated computer process can be normalized. It is noted that these standards may not be mutually exclusive in their protocols and/or requirements (e.g. the PCI standard can have approximately 230 line-items in common with the HIPPA standard, etc.). Each standard is made up of a set of controls that the enterprise entity must demonstrate compliance with.

Example controls for the PCI standard can include, inter alias requirements for a firewall at each Internet connection and between any demilitarized zone (DMZ) and the Internal network zone; restrict inbound and outbound traffic to that which is necessary for the cardholder data; environment and specifically deny all other traffic; do not allow any direct connections inbound or outbound for traffic between the Internet and the cardholder data environment; encrypt all non-console administrative access using strong cryptography like SSL, SSI, HTTPS etc.; use HTTPS load balancers and other SSL/Secured protocols for all access points; audit all actions taken by any individual with root or administrative privileges; etc. These examples are provided by way of illustration and not limitation.

ERCA system 102 can create a library of controls for a set of standards. In these way, an enterprise entity can select from the library of controls to create one or more template(s) to implement. For example, ERCA system 102 converts the PCI standard into a template. ERCA system 102 converts the HIPPA standard into a template. The enterprise entity can modify the templates and/or select various best practices in specific environments. ERCA system 102 can retrieve standard specifications from IT security policies 106. IT security policies 106 can be stored in a database, retrieved from a third-party server, etc.

System 100 can include enterprise networks 104. ERCA system 102 can implement various discovery agents. Discovery agents can be installed throughout the enterprise's network 104. Discovery agents gather the specified configuration and collect evidence of compliance from logs. ERCA system 102 can use discovery agents to discover all the applications and security components (e.g. firewalls, network security elements, etc.) and the like. It can be determined how each is configured. ERCA system 102 can use discovery agents to capture specified enterprise network configurations and/or information from logs. This information can describe the operations and operation history of enterprise networks 104 that are relevant to implementing the specified standards.

In one example, a standard can mandate a control that the enterprise networks 104 must have an antivirus programmed installed in specified portions of its system. The control can mandate that enterprise networks 104 periodically update their signatures to latest threats. ERCA system 102 can use discovery agents to discover configuration that informs it whether the necessary elements of enterprise networks 104 are present to implement this control. For example, the configuration can describe information about anti-virus program auto updates of required signatures. The associated log can be retried and used to obtain a history of compliance or non-compliance. The log can be used to determine if enterprise networks 104 have failed and the reason for the failure (e.g. not updated because not paid subscription, etc.). ERCA system 102 can compare the retrieved configuration log information against the control, ERCA system 102 can produce a compliance report. ERCA system 102 can then implement various actions to ensure/aid the enterprise entity to achieve compliance with the specified standard being applied.

Figure 2:
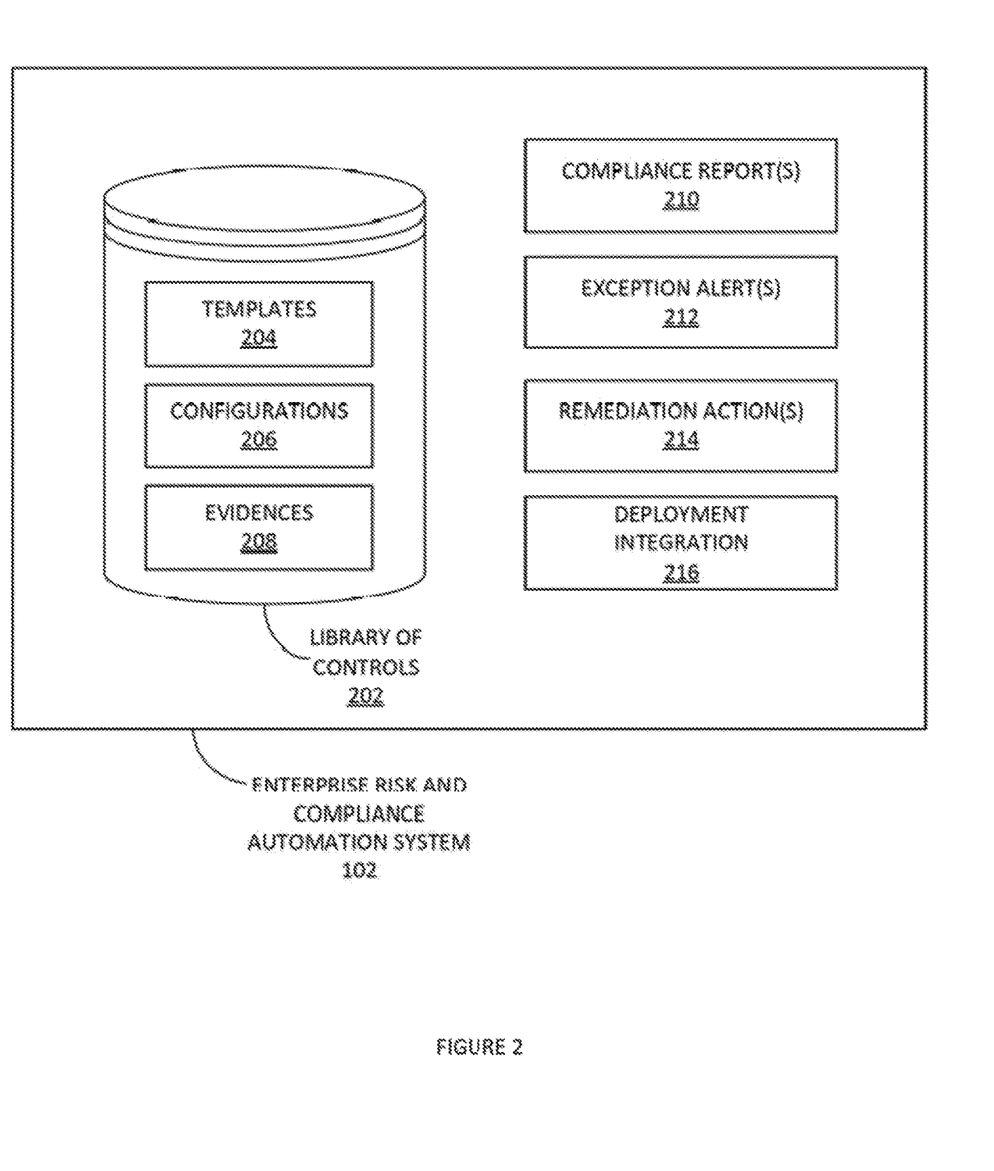
FIG. 2 illustrates an example of an enterprise risk and compliance automation system, according to some embodiments.

FIG. 2 illustrates an example of an ERCA system 102, according to some embodiments. ERCA system 102 can include a library of controls 202. Library of controls 202 can include various information utilized by ERCA system 102. For example, library of controls 202 can include templates 204, configurations 206, evidences 208, log information, other information retrieved from enterprise network(s) 104, etc. As noted supra, ERCA system 102 can compare the retrieved configuration/log information against the control. ERCA system 102 can produce a compliance report. ERCA system 102 can then implement various actions to ensure/aid the enterprise entity to achieve compliance with the specified standard being applied. For example, these actions can utilize compliance reports 210, exception alerts 212, remediation actions 214, deployment integration 216, etc. For example, ERCA system 102 can create alerts when detects that an aspect of the enterprise network(s) 104 is out of compliance. ERCA system 102 can suggest remedial action to an enterprise administration (e.g. in the form of a push notification, on an enterprise compliance dashboard interface, etc.). For example, an anti-virus program may not be activated, ERCA system 102 can determine that the anti-virus program is required by a relevant standard. ERCA system 102 can translate the anti-virus control to a template and apply the template to a review of enterprise network(s) 104, Accordingly, ERCA system 102 can notify an enterprise administrator to activate the anti-virus program. In another example, ERCA system 102 can query the enterprise administer for permission to activate the anti-virus program and/or other programs to bring enterprise network(s) 104 into compliance. In this way, ERCA system 102 can obtain enterprise administrator permission before implemented remediation actions.

It is noted that each template can consist of a set of controls from, each regulatory authority like PCI, HIPAA or enterprise best practices. In one example configuration, a set of controls from each template depends on system configuration (e.g. a firewall, load balancers etc.). Evidences ca be system generated actions in the log file which can be used to validate set controls from each template. A control can be a statement that describes the conditions that a transaction or activity must meet for it meet criteria. A template can be a collection of controls. (e.g. a control to build firewall and router configurations that restrict connections between entrusted networks and any system components in the cardholder data environment; restrict inbound and outbound traffic to that which is necessary for the cardholder data environment, and specifically deny all other traffic; secure and synchronize router configuration files; install perimeter firewalls between all wireless networks and the cardholder data environment, and configure these firewalls to deny or, if traffic is necessary for business purposes, permit only authorized traffic between the wireless environment and the cardholder data environment; etc.).

Configuration is the set of values assigned to a software or hardware component that influences how that component performs. Configurations are also referred to as settings, flags or parameters. Evidence is a log entry or an attribute value (could be a setting or flag) that confirms that one or more actions occurred. Example of evidence is an entry in the system log, which indicates that the anti-virus software ran a scan of the boot sector at a particular date/time.

An enterprise administrator can submit various standards (e.g. IT security policies standards, etc.) that it wishes to comply with to ERCA system 102 can as part of a deployment pipeline. ERCA system 102 can review relevant script (s) and determine if acceptable (e.g. opening more ports than valid, etc.). ERCA system 102 can then communicate warnings and the like to the enterprise administrator if the activity will make enterprise network(s) 104 out of compliance.

Enterprise administrators can provide security and/or other compliance goals (e.g. want firewalls to comply with PCI, etc.) to ERCA system 102. ERCA system 102 can then provide recommendations of specific actions to be taken and a set of best practices to be followed as part of a recommendation.

ERCA system 102 can normalize all these standards into a format that a computer can automatically process in a templatization process. The templatization process can generate template 204. During the templatization process, every control in a standard can be broken into a set of atomic operations that are coordinated by control flow constructs. Examples of these constructs include "if . . . then . . . else" or "for-all <elements in a set>". The atomic operations perform a specific check or validation and can be reused in multiple controls. Controls can be in a human-readable format. ERCA system 102 can use various NLP methods to convert the human readable normal language into a specific standard logical language. A control can be an instruction to verify a specific state or aspect of a configuration of an element of enterprise network(s) 104. ERCA system 102 can collect evidences 208 and configurations 206 of enterprise network(s) 104 and compare these against templates 204. In this way, enterprise network(s) 104 can programmatically determine if enterprise network(s) 104 is achieving a particular control value or not. Enterprise network(s) 104 can collect evidences 208 and convert these to a normalized fashion. This way, the evidence can be reused to validate any other control. It is noted that ERCA system 102 can be implemented with a plug-and-play architecture. In same examples, ERCA system 102 can implement the various relevant processes provided infra. ERCA system 102 can report exception alerts to any tracking and alerting system that is used by a Network Operations Center (NOC) or Security Operations Centers (Sac) 108.

Figure 3:
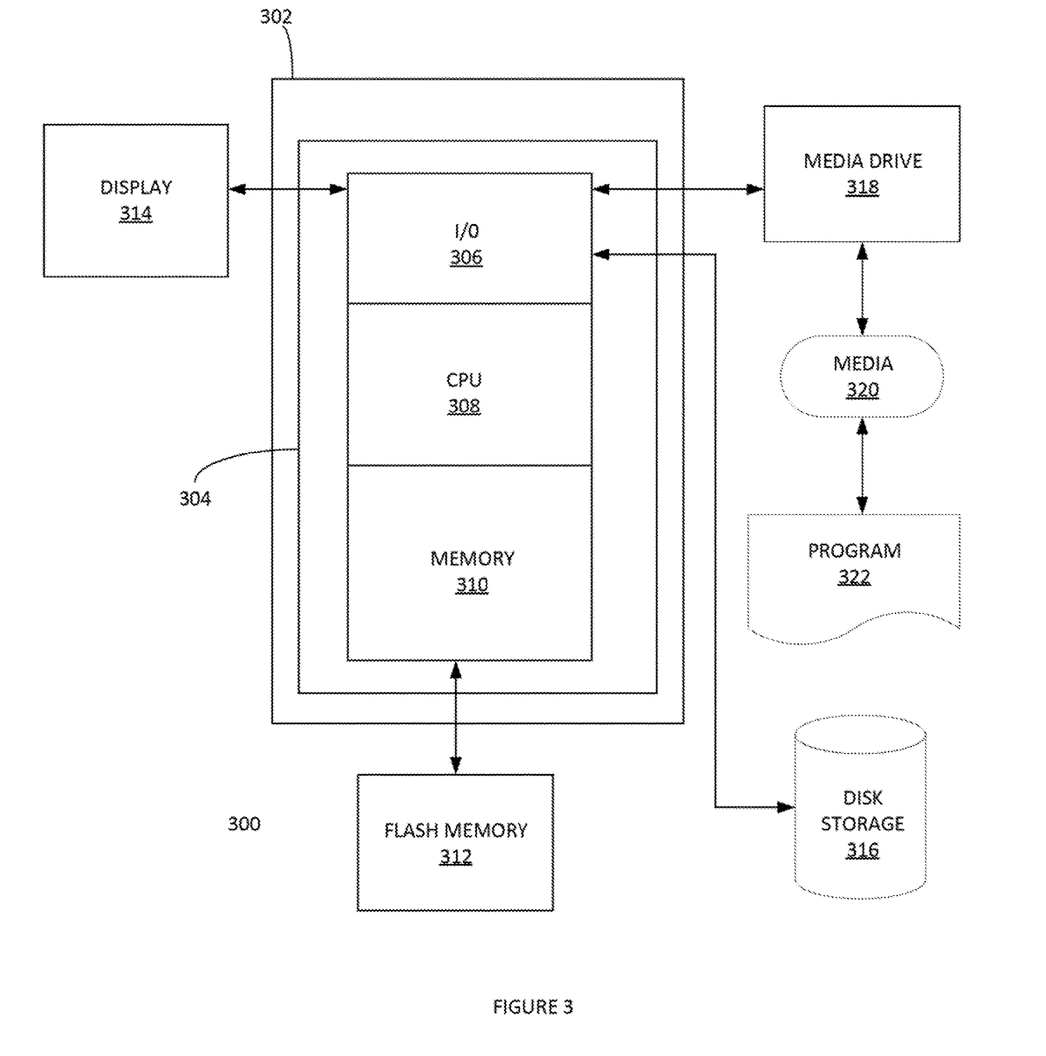
FIG. 3 depicts an exemplary computing system that can be configured to perform any one of the processes provided herein.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it.

The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing stem 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 4:
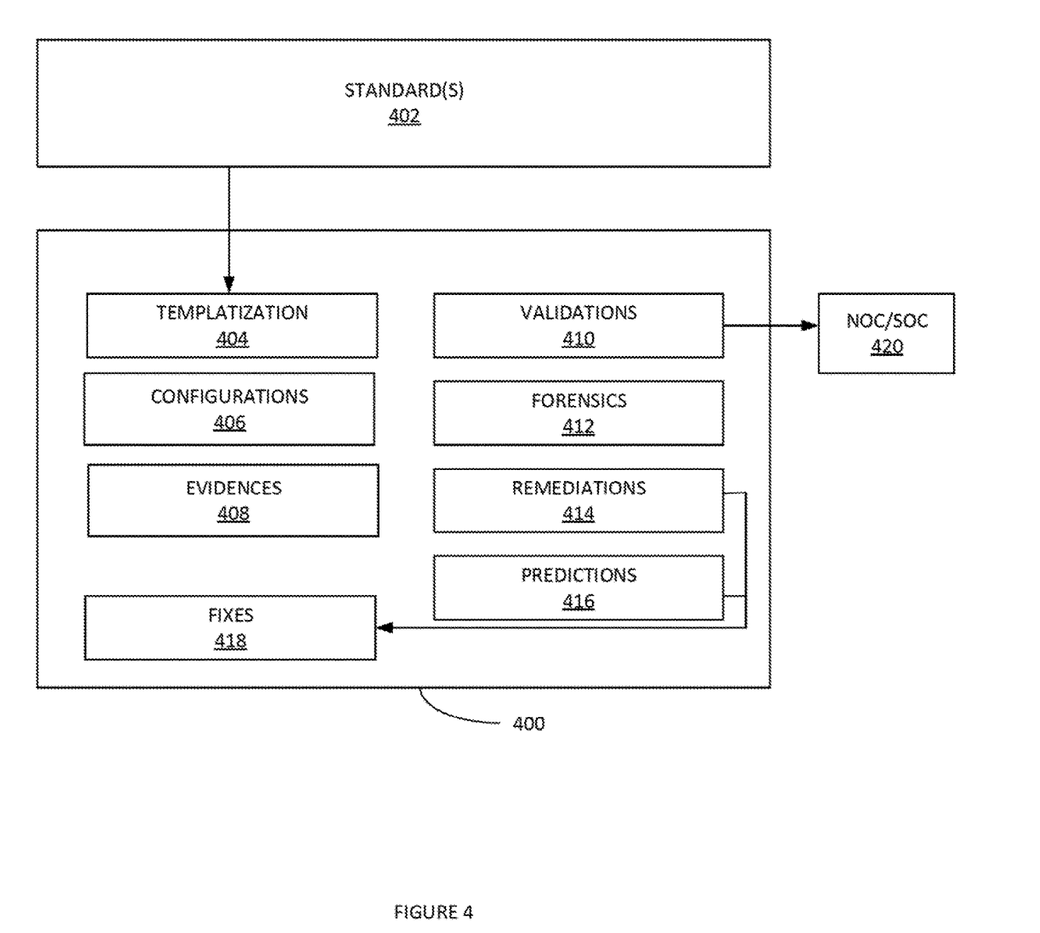
FIG. 4 illustrates another example of an ERCA engine, according to some embodiments.

FIG. 4 illustrates another example of an ERCA engine 400, according to some embodiments. ERCA system 400 can receive various standards 402 (e.g. PCI, HIPPA, ISO-27002, CORBIT, CIS, GDPR, customized standards, etc.). The standards can be in a human-readable format. ERCA engine 400 can normalize the standards. Normalization can include placing the standard's in a machine-readable format.

In one example, the ERCA engine 400 can then templatize the standards in step 404 ERCA engine 400 can then discover the customers own systems configurations 406 (e.g. from log, files, etc.) and provided evidence(s) 408. For example, ERCA engine 400 can discover the information about the customer's system and collect evidence (e.g. if running antivirus, etc.). Evidence can be discovered from client's logs, cloud-based databases, etc. ERCA engine 400 can compare the discovery of 406-408 with the requirements of the standard and output a validation report 410. Validation report 410 can provide a report of whether the client's system has met of all requirement of the input standards. Validation report 410 can be used for forensics 412, remediation plan 414, predictions of future violations 416 (e.g. based historical issues that can cause violation of standards), etc. For example, Validation report 410 can be used to predict possible attacks and/or attack weaknesses, etc. ERCA engine 400 can end validation report 410 monitoring center to take actions to fix standard-related issues. Remediation plan 414 and/or predictions of future violations 416 can be used to implement fixes 418.

ERCA engine 400 can build a Global Controls Library (GCL) which is a set of simple validations. The standards can have complex controls (e.g. does password must have length greater than eight characters, password must include a symbol, etc. ERCA engine 400 can configure a complex PCI rule by mapping the rule to multiple GCL rules, using an expression, etc. The GCL can use primitives and/or atomic operations. The GCL can read the configuration (e.g. from AWS) or locate it in a log file. ERCA engine 400 can build the GCLs by reusing these primitives.

ERCA engine 400 can produce output 420 that is then validated and archived. ERCA engine 400 can generate validation reports of various standard types (e.g. CIS Foundation reports, PCI DSS ROC, SOC 2 Report, Exception Alerts, NOC/SOC ITSM, Analytics (e.g. how configurations changed over time, etc.), etc.).

Examples Processes

The processes provided herein can be implemented using the various systems of FIGS. 1-4, in some example embodiments.

Figure 5:
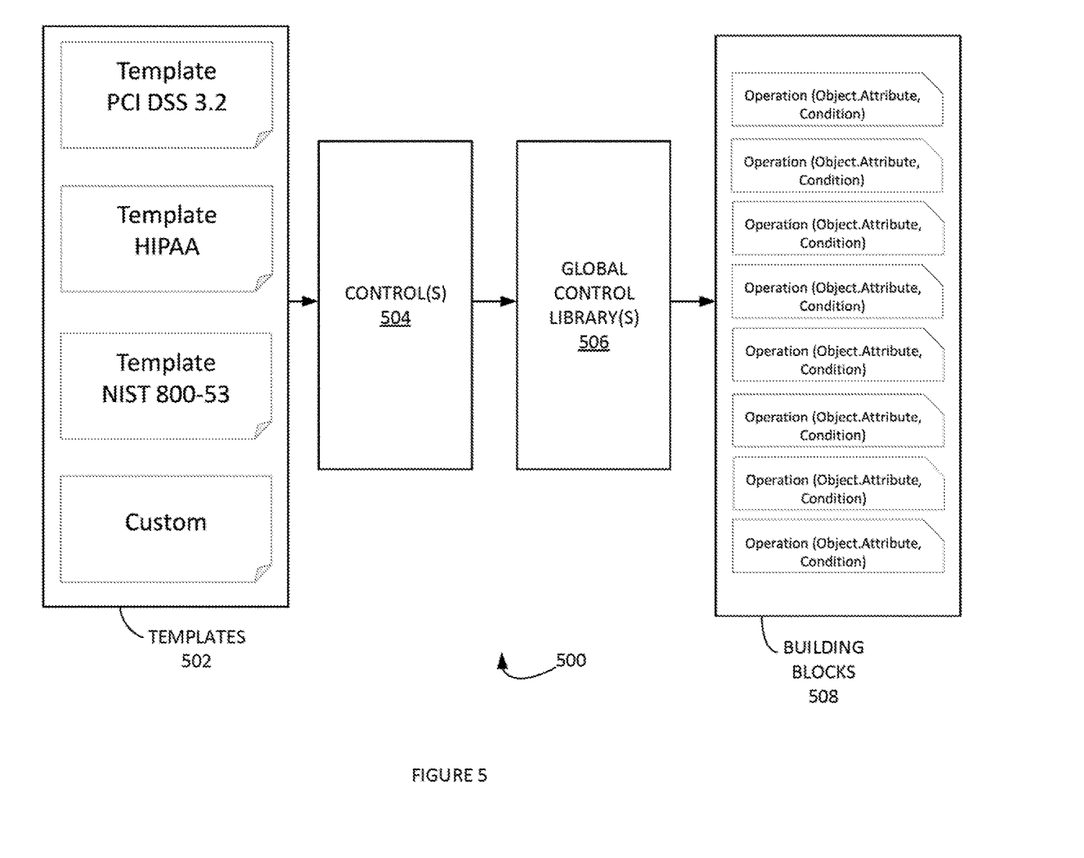
FIG. 5 illustrates an example enterprise risk and compliance automation process, according to some embodiments.

FIG. 5 illustrates an example enterprise risk and compliance automation process 500, according to some embodiments. In step 502, templates can be converted to controls 504. It is noted that each standard (e.g. PCI, etc.) includes a number of controls 504. For example, PCI can require that passwords must be of a particular strength, the password must include at least one capital character, etc. In step 506, process 500 can build and/or access a global control library (GCL). The GCL can include a library of tests that can be used to generate a particular control. A set of tests that can be combined in various combinations to generate a particular standard's control. Optimization can then be implemented using one or more building blocks 508. Example building blocks can include: 'a function to read a log and tell me what's happening'; 'a function to go to a machine and see what is running on it'; 'a process to retrieve some specified information about a computer system'; etc. These building blocks 508 can be used to build a specific optimization process as well.

Figure 6:
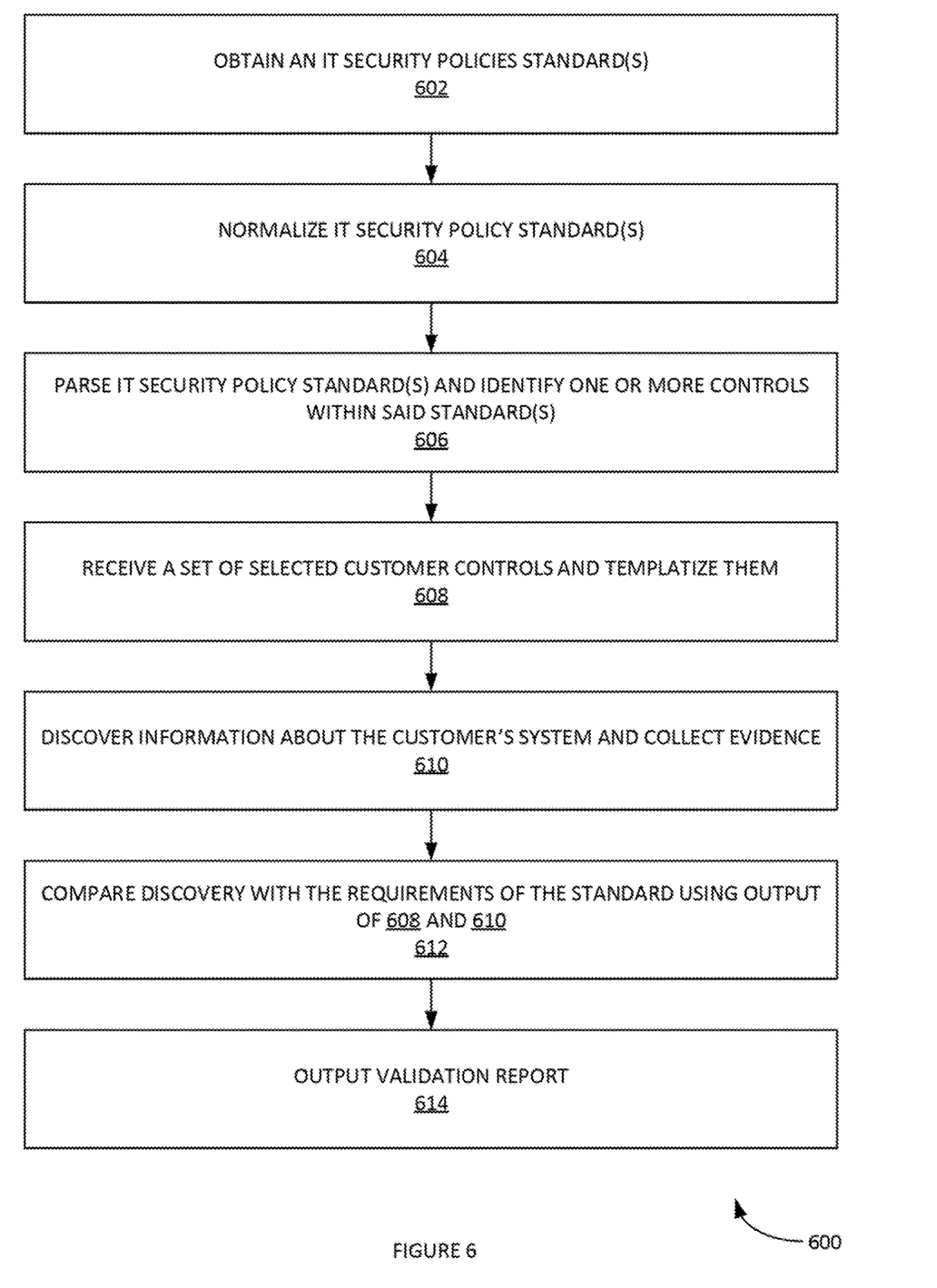
FIG. 6 illustrates an example process for, according to some embodiments.

FIG. 6 illustrates an example process 600 for, according to some embodiments. In step 602, process 600 can obtain one or more IT security policies standard(s) to be applied to the client's computing system(s) and/or networks. In step 604, process 600 can normalize said IT security policy standard(s). In step 606, process 600 can parse the IT security policy standards) and identify one or more controls within said standard(s). In step 608, process 600 can receive a set of selected customer controls and templatize them. In step 610, process 600 can discover information about the customer's system and collect evidence. In step 612, process 600 can compare discovery with the requirements of the standard using output of 608 and 610. In step 614, process 600 can output validation report.

Figure 7:
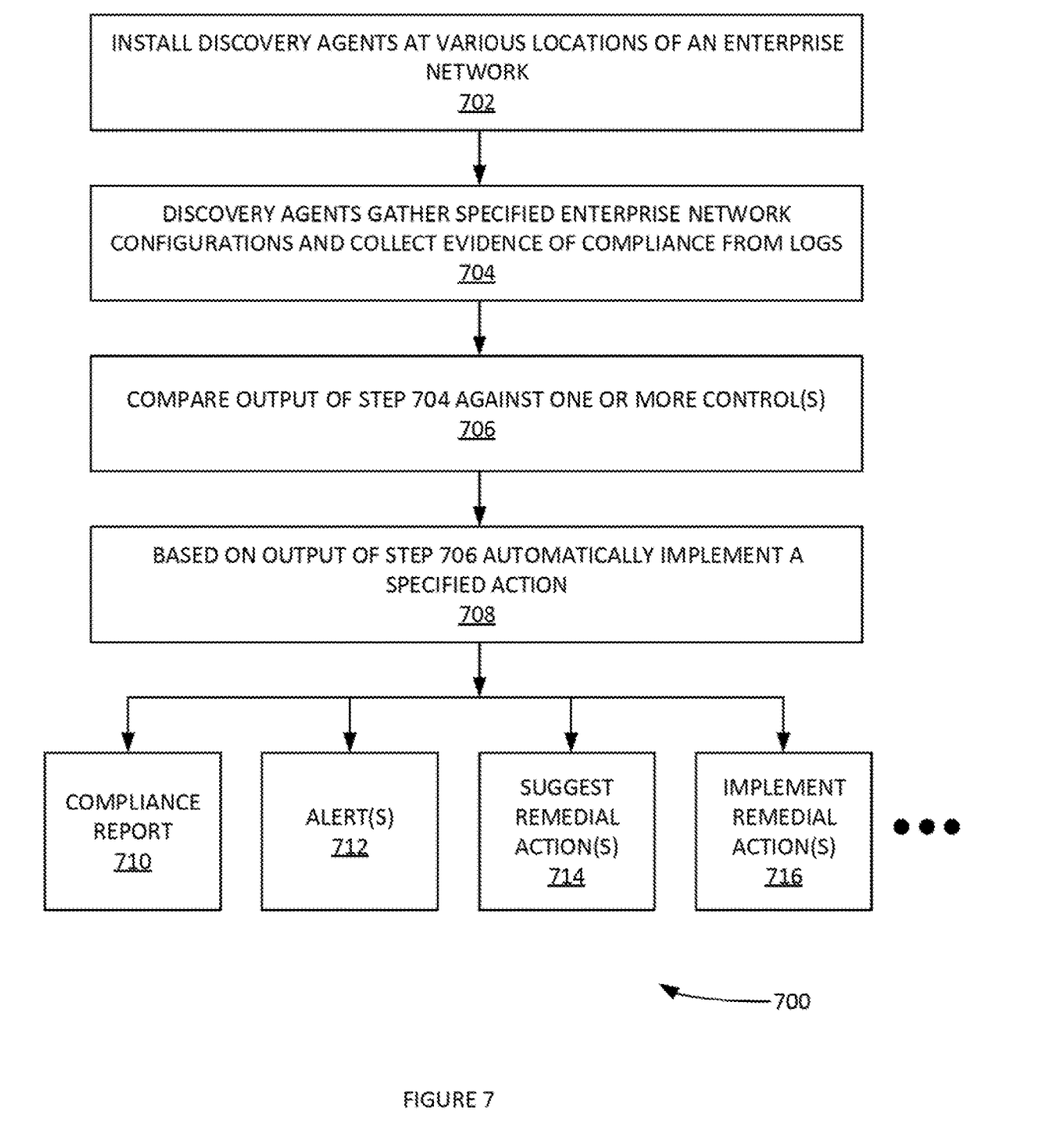
FIG. 7 illustrates an example process for implementing discovery agents, according to some embodiments.

FIG. 7 illustrates an example process 700 for implementing discovery agents, according to some embodiments. In step 702, process 700 can install discovery agents at various locations of an enterprise network. In step 704, discovery agents gather specified enterprise network configurations and collect evidence of compliance from logs. In step 706, process 700 can compare output of step 704 against one or more control(s). In step 708, based on output of step 706, process 700 can automatically implement a specified action. Example actions include, inter alia: compliance report(s) 710, alert(s) 712, suggest remedial action(s) 714, implement remedial action(s) 716, and the like.

Figure 8:
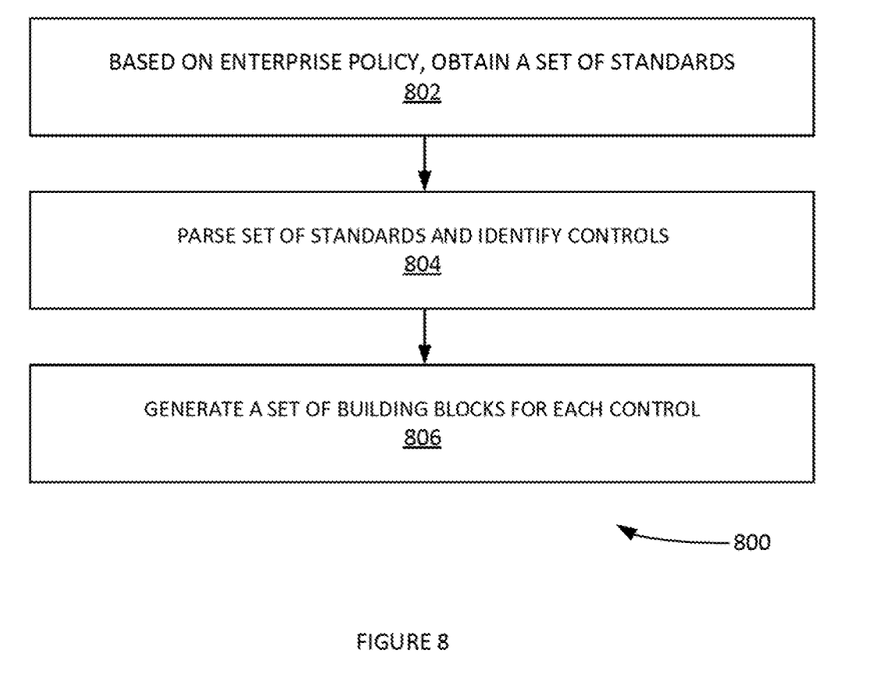
FIG. 8 illustrates an example discovery process for topology, according to some embodiments.

FIG. 8 illustrates an example discovery process 800 for topology, according to some embodiments. In step 802, process 800 can, based on enterprise policy, obtain a set of standards. In step 804, process 800 can parse set of standards and identify controls. In step 806, process 800 can generate a set of building blocks for each control.

Figure 9:
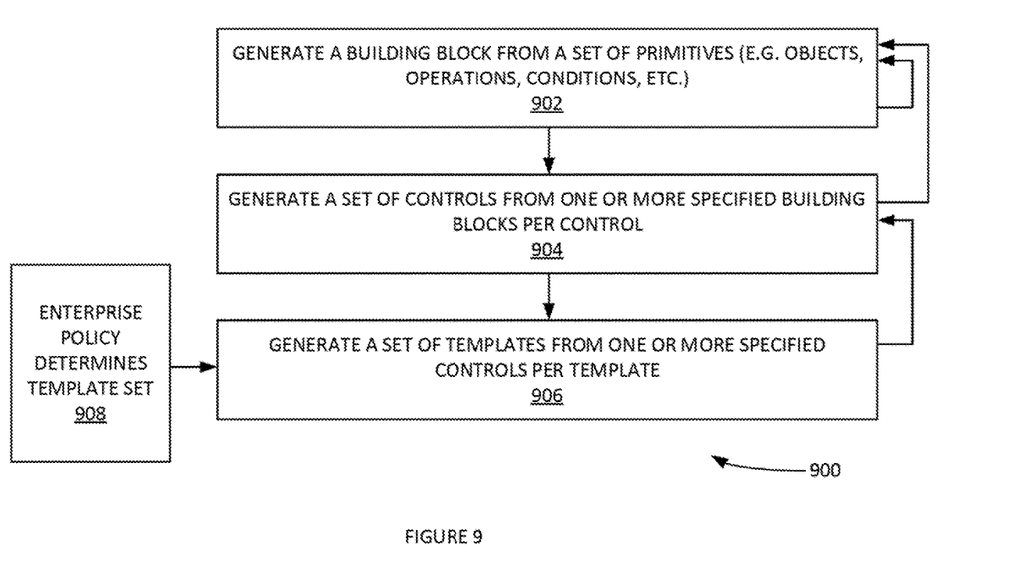
FIG. 9 illustrates an example process for generating templates from controls of one or more IT security policies standards, according to some embodiments.

FIG. 9 illustrates an example process 900 for generating templates from controls of one or more IT security policies standards, according to some embodiments. The standards can be in a human-readable format. Example standards include, inter alia: HIPPA, PCI, ISO IT security standards, COBIT, GDPR, CIS, NIST IT security standards, etc. In one example, a control can be a specific security action that is to be taken to satisfy a portion of a standard. Process 900 can transform the specific IT controls of these standards to a format that is implementable by a computer program in an automated process. In step 902, process 900 can generate a building block from a set of primitives (e.g. objects, operations, conditions, etc.). In step 904, process 900 can generate a set of controls from one or more specified building blocks per control. In step 906, process 900 can generate a set of templates from one or more specified controls per template. In step 908, process 900 can enterprise policy determines template set.

Figure 10:
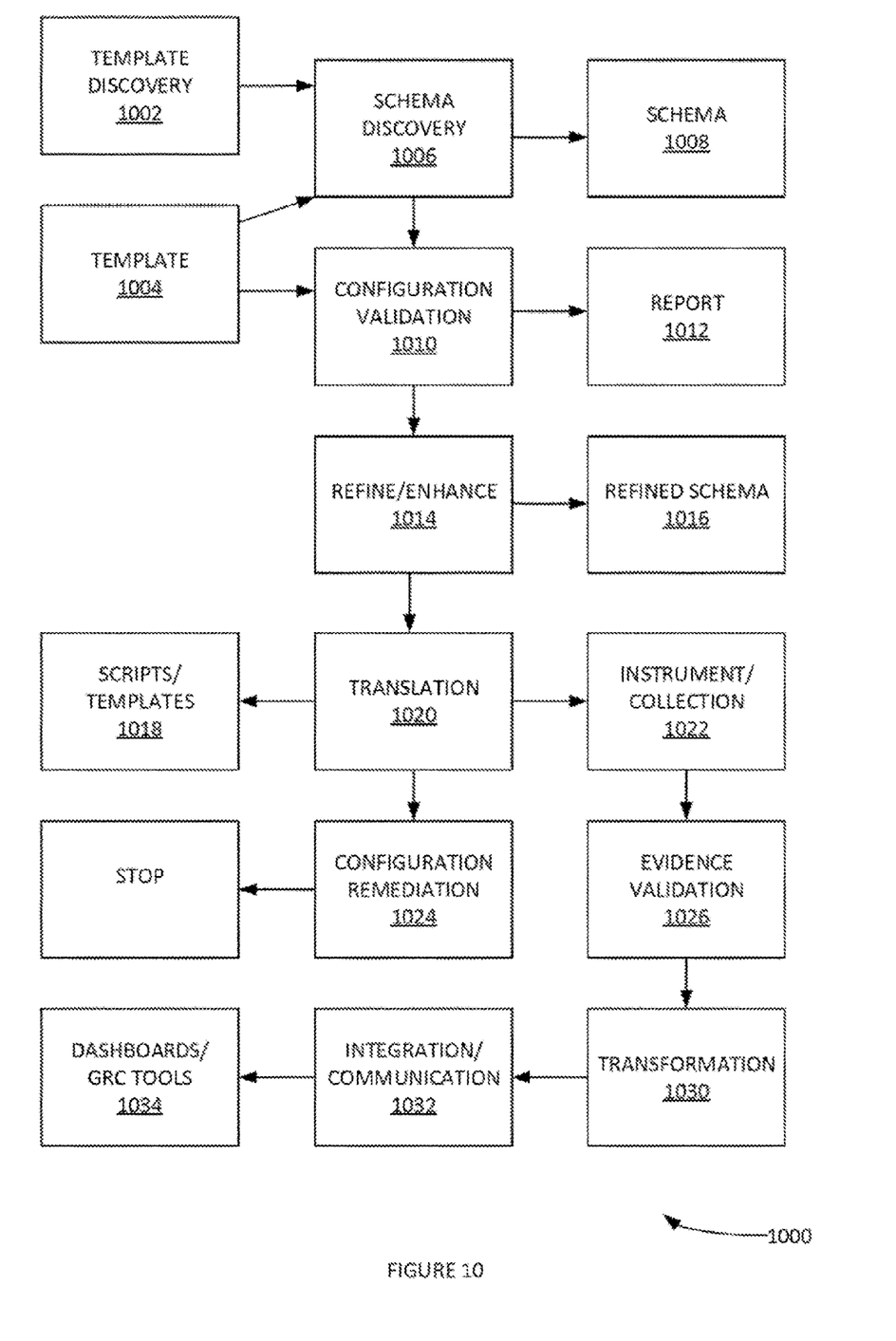
FIG. 10 illustrates an example process r enterprise risk and compliance automation, according to some embodiments.

FIG. 10 illustrates an example process for enterprise risk and compliance automation, according to some embodiments. In step 1002, process 1000 can implement topology discovery. In step 1006, the output of 1002 and template 1004 can be utilized by a schema discovery process to generate schema 1008. In step 1010, (The report 1012 can be generated by the validation of the schema 1010 against the template 1004. Process 1000 can implement configuration validation and generate a report 1012. In step 1014, process 1000 can further refine/enhance the schema to generate a refined schema 1016. In step 1020, process 1000 can implement translation of scripts/templates 1018 for each target cloud. In step 1022 process 1000 can implement instrument/collection. In step 1024, process 1000 can implement configuration remediation methods. In step 1026, process 1000 can implement evidence validation from the collected configuration 1022. In step 1030, process 1000 can implement transformation. In step 1032, process 1000 can implement integration/communication methods. The output of step 1032 can be provided to dashboards/GRC (Governance, Risk and Compliance) tools 1034 for display to an administrator/user.

It is noted that various methods of risk scoring can be implemented. For example, controls can be assigned a severity indicating the level of risk the loss of that control exposes the enterprise to. These severity levels can be adjusted by an enterprise based on the type of business the enterprise is in or the type of data on the enterprise applications. Using this information, the system can not only provide a report on which controls are met and which ones are not but can also provide a composite risk score. This can be comparable to a FICO score for credit rating. The single score can provide a measure of the state of the security of the enterprise and help track improvements from time to time.

It is noted that one to many mapping can be implemented in some example embodiments. Configurations from many environments can be captured. These can be represented in a neutral language (e.g. SNL (Spanugo Neutral Language)). This can enable the representation of the core of any system in a standard way. Once so represented, with the right driver, these can be translated to any new system.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method useful for implementing an enterprise risk and compliance automation engine comprising:
   obtaining an information technology (IT) security policy standard;
   normalizing the IT security policy standard into a machine-readable format;
   templatizing the machine-readable format version of the IT security policy standard, wherein each template comprises a collection of controls, wherein each control comprises a statement that describes a condition that a transaction or activity an IT system is required to perform by IT security policy standard, wherein the IT security policy standard comprises a specified complex control;
   configuring the specified complex control by mapping the specified complex control to a plurality of atomic operations or rules of a Global Controls Library (GCL);
   discovering a set of configurations of the IT system;
   comparing the set of configurations of the IT system with the collection of controls of each template; and
   generating a validation report that comprises a report of whether the set of configurations of the IT system satisfies the collection of controls of each template.

2. The method of claim 1, wherein the set of configurations are discovered from IT system logs.

3. The method of claim 1, further comprising using the validation report to perform forensic analysis of the IT system, create a remediation plan of the IT system, or predict future violations of the IT system.

4. The method of claim 1, further comprising:
   building the GCL comprising a set of atomic operations or rules.

5. The method of claim 1, wherein the specified complex control comprises a PCI rule, a HIPPA rule, an ISO-27002 rule, a CORBIT rule, a CIS, a GDPR, or a customized standard of the IT system.

6. The method of claim 1, wherein the IT security policy standard is in a human-readable format.

7. A computing system useful for implementing an enterprise risk and compliance automation engine comprising:
   a processor configured to execute instructions;
   a memory containing instruction that, when executed on the processor, causes the processor to perform operations that;
   obtain an information technology (IT) security standard;
   normalize the IT security policy standard into a machine-readable format;
   templatize the machine-readable format version of the IT security policy standard, wherein each template comprises a collection of controls, wherein each control comprises a statement that describes a condition that a transaction or activity an IT system is required to perform by IT security policy standard, wherein the IT security policy standard comprises a specified complex control;
   configuring the specified complex control by mapping the specified complex control to a plurality of atomic operations or rules of a Global Controls Library (GCL);
   discover a set of configurations of the IT system;
   compare the set of configurations of the IT system with the collection of controls of each template; and
   generate a validation report that comprises a report of whether the set of configurations of the IT system satisfies the collection of controls of each template.

8. The computing system of claim 7, wherein the set of configurations are discovered from IT systems logs.

9. The computing system of claim 7, wherein the memory containing instructions that when executed on the processor, causes the processor to perform operations that use the validation report to perform forensic analysis of the IT system, create a remediation plan of the IT system, or predict future violations of the IT system.

10. The computing system of claim 7, wherein the memory containing instructions that when executed on the processor, causes the processor to perform operations that build the GCL comprising a set of atomic operations or rules.

11. The computing system of claim 7, wherein the specified complex control comprises a PCI rule, a HIPPA rule, an ISO-27002 rule, a CORBIT rule, a CIS, a GDPR, or a customized standard of the IT system.

12. The computing system of claim 7, wherein the IT security policy standard is in a human-readable format.

* * * * *